United States Patent [19]

Clark

[11] Patent Number: 5,109,955
[45] Date of Patent: May 5, 1992

[54] APPARATUS FOR GREASING A WHEEL BEARING HUB

[76] Inventor: Jimmy E. Clark, 109 Farrs Bridge Rd., Greenville, S.C. 29611

[21] Appl. No.: 555,179

[22] Filed: Jul. 20, 1990

[51] Int. Cl.⁵ .......................................... F16N 21/04
[52] U.S. Cl. .................................. 184/105.2; 184/5.1; 222/256; 222/330
[58] Field of Search .................. 184/105.1, 105.2, 5.1; 222/145, 330, 478, 256; 239/568, 549; 137/561 A

[56] References Cited

U.S. PATENT DOCUMENTS

| Re. 26,180 | 4/1967 | Frenzel et al. | 222/330 |
|---|---|---|---|
| 1,522,062 | 1/1925 | Jeffries | 184/105.3 |
| 1,545,149 | 7/1925 | Ludwick | 184/37 |
| 1,570,367 | 1/1926 | Wolf | 184/105.3 |
| 1,734,288 | 11/1929 | Davis | 184/105.3 |
| 2,555,563 | 6/1951 | Benton | 222/330 |
| 2,656,012 | 10/1953 | Thorpe | 184/5.1 |
| 3,301,490 | 1/1967 | Hruby | 239/548 |
| 3,338,333 | 8/1967 | Wrasse | 184/5.1 |
| 3,643,689 | 2/1972 | Isreeli et al. | 137/561 A |
| 4,027,929 | 6/1977 | Huddleston | 184/5.1 |
| 4,168,766 | 9/1979 | Shultz | 184/5.1 |
| 4,549,567 | 10/1985 | Horton | 137/561 A |

FOREIGN PATENT DOCUMENTS

| 0742730 | 1/1944 | Fed. Rep. of Germany | 184/5.1 |
|---|---|---|---|
| 0074392 | 4/1954 | Netherlands | 137/561 A |

Primary Examiner—Ira S. Lazarus
Assistant Examiner—Alan B. Cariaso
Attorney, Agent, or Firm—Bailey & Hardaway

[57] ABSTRACT

An attachment for use with a grease gun receives grease under pressure therefrom in a reservoir, and at least three, outwardly projecting, circumferentially spaced nozzles are carried by the attachment uniformly dispensing grease into and supporting a hub upon a spindle.

4 Claims, 2 Drawing Sheets

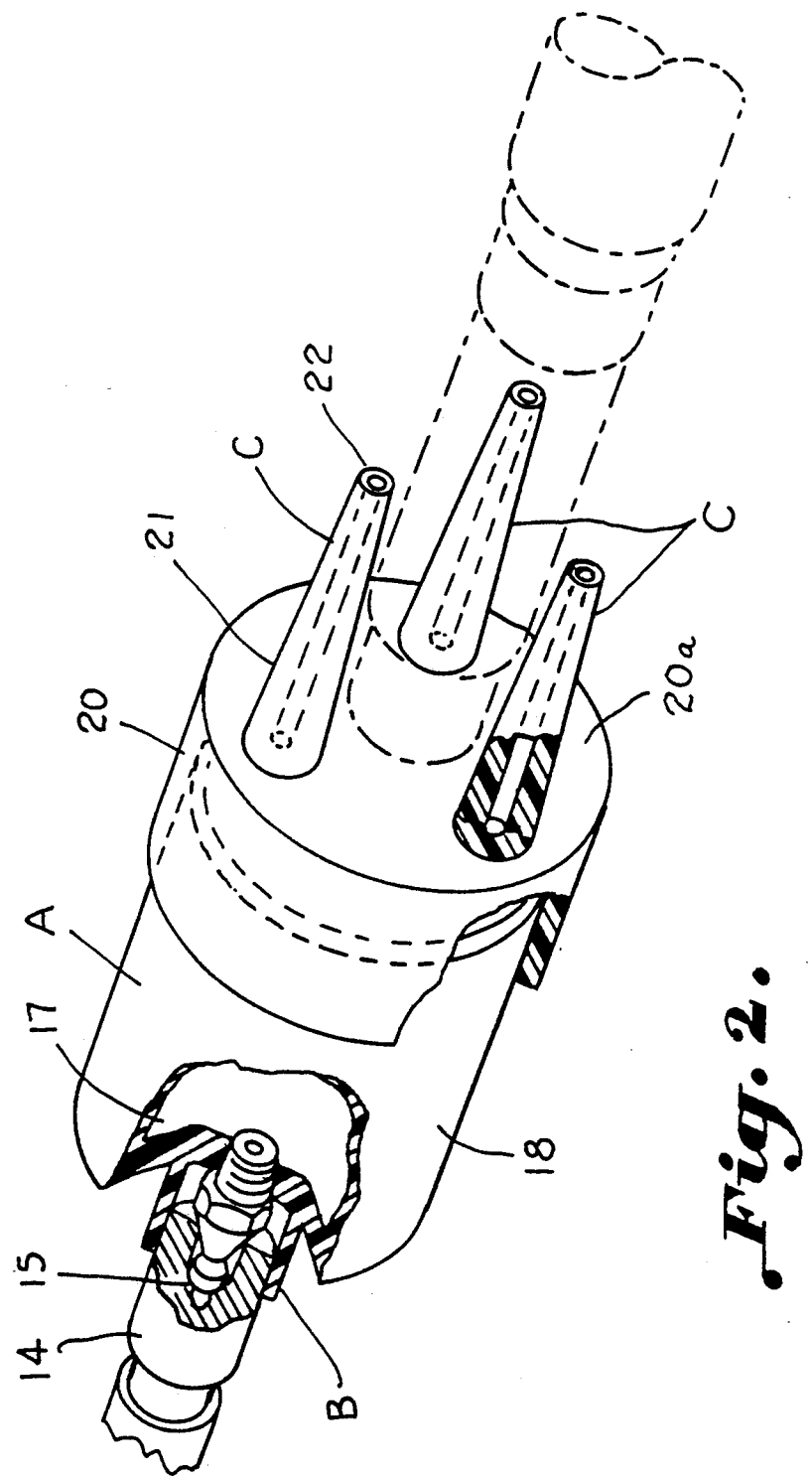

APPARATUS FOR GREASING A WHEEL BEARING HUB

BACKGROUND OF THE INVENTION

This invention relates to an attachment for use with a source of grease under pressure for readily dispensing grease uniformly about a hub for containing wheel bearings upon the spindle of a vehicle such as a trailer, automobile or truck.

In order to grease a hub, it has been the practice to first pack the inner bearing with grease and position same within the hub and a upon the spindle. Grease is spread by hand uniformly about the grease receiving cavity within the hub which must be manually positioned in alignment on the spindle to receive the grease uniformly therein preparatory to insertion of a packed outer bearing. Since the hands of the operator are by this time covered with grease, the outer surface of the hub and its flange are also smeared with grease requiring cleaning especially if the hub is to be painted.

The prior art also include U.S. Pat. Nos. 2,656,012, 3,338,333 and 4,027,929 which illustrate attachments incorporating reservoirs, but there are no means illustrated for uniformly distributing the grease in the hub.

An important object of this invention is to provide apparatus to facilitate greasing of a wheel bearing hub avoiding the need for grease clean up and consequent wasting of grease.

Accordingly, it is an important object of this invention to provide an attachment for greasing a hub in such a way as to dispense the grease uniformly without the need for manually smearing the grease within the hub.

Another important object of the invention is to provide an apparatus having three circumferential nozzles insertable within a wheel bearing hub and the like maintaining same in alignment as upon a spindle for even grease distribution within the hub.

Another object of the invention is to speed up and make easier the task of greasing wheel bearing hubs.

SUMMARY OF THE INVENTION

It has been found that an attachment for use with a grease gun has a reservoir containing grease under pressure received from a grease gun and at least three circumferentially spaced nozzles are carried by the attachment uniformly dispensing grease into and supporting a hub upon a spindle for uniform distribution of grease about and within the hub. The attachment is releasable from the grease gun, and the reservoir has a removable end closure member in the form of a cap which carries the nozzles which are preferably flexible, tapering inwardly toward their outer ends.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 2 is a perspective view of the attachment looking toward the three circumferentially spaced nozzles communicating with the reservoir.

DESCRIPTION OF A PREFERRED EMBODIMENT

Figure 1:
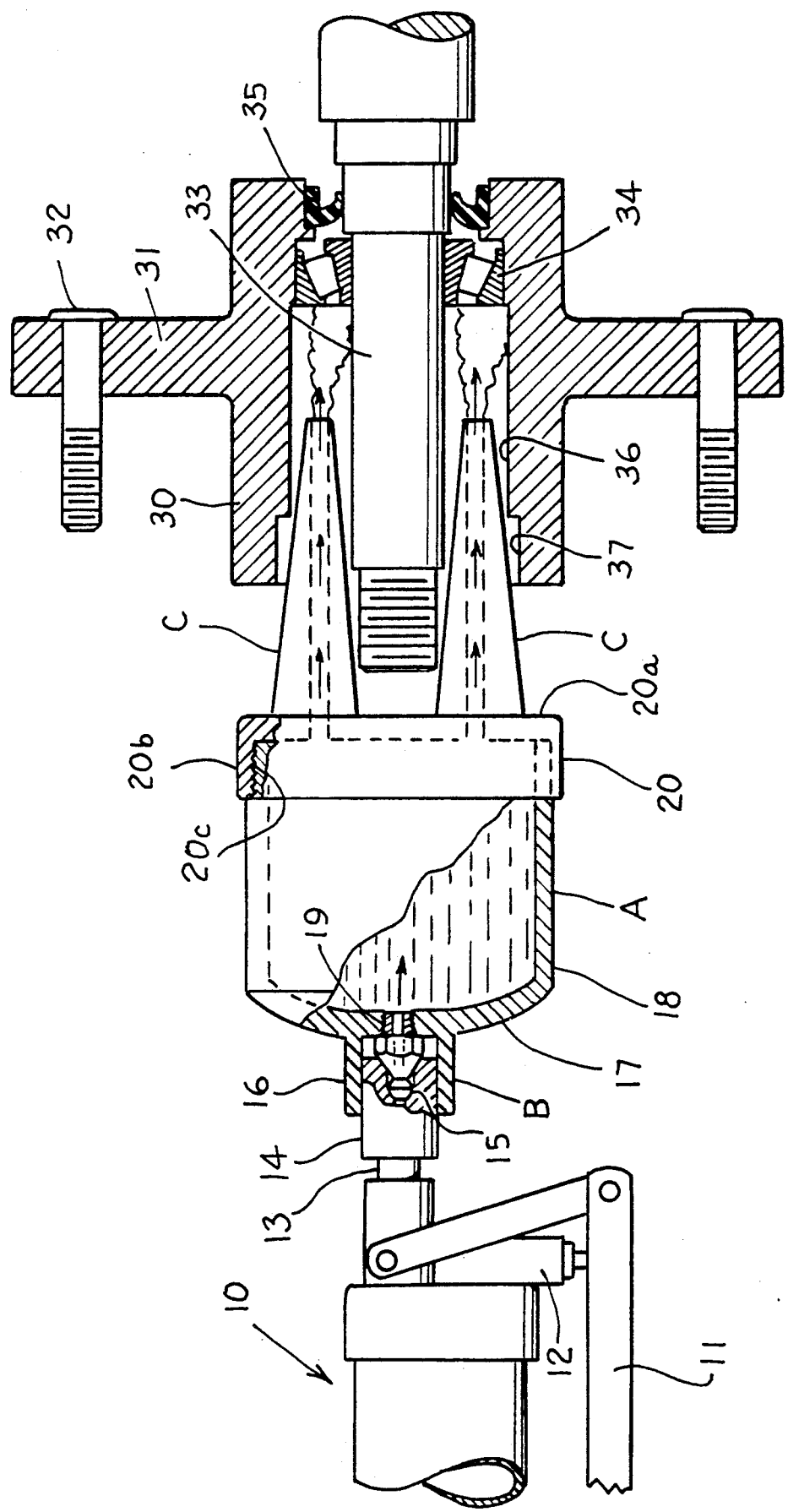
FIG. 1 is a longitudinal sectional elevation illustrating an attachment constructed in accordance with the invention having a reservoir coupled to a grease gun dispensing grease through spaced nozzles into a hub carried by a spindle.

Apparatus for dispensing grease from a grease gun to a wheel bearing hub carried by a spindle for containing a wheel bearing includes a reservoir A for containing grease under pressure. A coupling B on the reservoir connects the reservoir to a grease gun for dispensing grease under pressure into the reservoir. At least three circumferentially spaced nozzles C are carried by the reservoir extending outwardly of the reservoir for dispensing grease into the housing. The nozzles are insertable between the hub and the spindle supporting the bearing housing. The spaced nozzles dispense grease into the hub uniformly thereabout.

FIG. 1 schematically illustrates a manually operated grease gun broadly designated at 10 having a pivoted handle 11 for operating a cylinder 12 to build up pressure for delivery through the opening 13 to the fitting 14 which is receivable upon a nipple 15 within the tubular portion of the coupling 16 carried by the reservoir A. The tubular coupling 16 is carried by a base portion 17 of the reservoir A which is defined thereby together with the sides 18. The nipple 15 communicates with the reservoir A through the passageway 19.

The reservoir has a removable cap 20 which has an outer surface 20a and sides 20b which may be threadably secured as at 20c or as by a press fit to the upper outer portion of the sides of the reservoir A.

The spaced circumferential nozzles C are circumferentially spaced at an angle of 120° about a circumferential portion of the outer surface 20a of the cap 20. The nozzles are preferably integral with the cap and are constructed of flexible material tapering outwardly as at 21 from the surface 20a toward a tip or free end. It should be noted that there is an opening 22 extending from the tip entirely through the nozzles and the cap 20 and into the reservoir A.

As is further illustrated in the drawings, the spaced nozzles dispense grease into the hub 30 which carries a flange 31 with suitable lug bolts 32. The hub is carried upon a spindle 33 and is provided with a back bearing 34 and a seal 35. It will be noted that the nozzles project into a bore 36 within the hub for containing grease and extend past the bearing race 37 of an outer bearing.

OPERATION

The hub packer unit is illustrated herein as an attachment for use on a grease pump. During greasing, the inner bearing is inserted into the hub and sealed. Then the spindle is received into the hub. The inner bearing is preferably prepacked as by a bearing packer such as illustrated in U.S. Pat. No. 4,168,766. The three prongs of the attachment are inserted around the spindle until the free ends are just past the inside of the outer bearing race and centered on the spindle. The grease pump is attached to the hub packer attachment and grease is pumped into the hub until it is as full as desired. The hub packer attachment is then detached from the grease pump hose and removed from the hub. The outer, prepacked bearing, flat washer, castle nut, carter key, and dust cap (not shown) may be positioned.

It is thus seen that apparatus has been provided for eliminating the waste of packing grease as well as the mess associated with the hand packing of hubs.

While a preferred embodiment of the invention has been described using specific terms, such description is for illustrative purposes only, and it is to be understood that changes and variations may be made without departing from the spirit or scope of the following claims.

What is claimed is:

1. Apparatus for dispensing grease from a grease gun to a wheel bearing hub for containing a wheel bearing carried by a spindle comprising:

a reservoir for containing grease under pressure;

a coupling on said reservoir connecting said reservoir to a grease gun for dispensing grease under pressure into said reservoir;

at least three spaced nozzles carried by said reservoir extending outwardly of said reservoir for dispensing grease into said housing;

said nozzles being insertable between said hub and said spindle; and said spaced nozzles dispensing grease into said hub uniformly thereabout.

2. The structure set forth in claim 1, wherein said reservoir has an open end opposite said coupling, a removable end closure member over said open end, and said spaced nozzles being carried by an outer end surface of said closure member, being flexible and extending outwardly from and communicating with said grease in said reservoir, and being elongated tapering inwardly a free end.

3. An attachment for dispensing grease from a grease gun to a hub for containing wheel bearings axially carried by a spindle comprising:

a pressurized reservoir for containing grease under pressure;

a coupling on said reservoir releasably connecting said reservoir to a grease supply for dispensing grease under pressure into said reservoir;

a removable cap remote from said coupling forming one end of said reservoir; and three spaced nozzles molded integrally with and spaced circumferentially about said removable cap extending outwardly from said reservoir and directly communicating with said grease under pressure in said reservoir.

4. The structure set forth in claim 3 wherein said nozzles are flexible tapering inwardly toward a free end.

* * * * *